United States Patent Office 3,039,349
Patented June 19, 1962

3,039,349
OPTICAL DEVICE HAVING LIGHT
FILTERING MEANS
Thomas E. Rodgers, Burbank, Calif., assignor to Northrop Corporation, Beverly Hills, Calif., a corporation of California
Filed Oct. 19, 1959, Ser. No. 847,173
6 Claims. (Cl. 88—1)

The present invention relates to optics, and more particularly to an optical element having a light-absorbing composition which is highly efficient in reducing internal reflections in said optical element.

This application is a continuation in part of my application Serial No. 430,552, filed May 18, 1954, now abandoned, which is a continuation application of my application Serial No. 344,176, filed March 23, 1953, now abandoned.

It is well known that, when a beam of light passes through the boundary of two media having different indices of refraction, such as an air-glass interface for example, a certain percentage of light will be reflected back by the interface, instead of passing through. Thus, as light is transmitted through an optical element made of an optical material such as glass, for example, and strikes an interface such as the bounding surface between the glass and air, the light reflected back into the optical element from the interface is called internal reflection. Such reflections can be the source of many troublesome problems in optical systems by causing undesirable glare, halation, ghosts, etc., therein.

In certain optical systems, for a specific example, it has been found that a reflecting prism mounted to transmit light from a selected radiant source into a fixed telescope will yield many secondary images or ghosts in glare peaks; such ghost images usually being produced by a complicated series of internal reflections which are generated by undesirable stray light rays incident to the transmitting surfaces being reflected back into the prism from the interface. These internal reflections can seriously impair the final image definition. Such reflections, however, can have equally undesirable effects with respect to even the simplest optical devices.

It is an object of the present invention to provide a composition having highly efficient light-absorbing characteristics when used in conjunction with an optical interface between two optical media having different indices of refraction.

It is another object of the invention to provide an optical element having compositions as layers on a surface of an optical element to reduce internal reflections therein when used in conjunction with one or more of its optical interfaces.

It is a further object of the invention to provide an optical element having a light-absorbing composition for reducing internal reflections in optical elements, and an overcoating layer which will not interfere with the desired rays forming the final image.

It is a still further object of the present invention to provide light-absorbing compositions which can be used to advantage in conjunction with structural type optical glare stops.

Other objects and advantages inherent in the present invention will be seen as the specification progresses.

Briefly, the composition of the present invention in one particular embodiment particularly suitable for use with optical elements, takes the form of a liquid for application to a surface or optical interface of an optical element of a known index of refraction; the liquid containing a light-transmitting material which is capable of being solidified on a surface of the optical element to form a layer thereon. Also included in the liquid is a coloring material, such as dye or mixture of dyes having highly efficient light-attenuating characteristics. The optical characteristics of the liquid are adjusted, by adding suitable amounts of preferably transparent mutually soluble substances having high or low refractive indices to obtain a final light-absorbing composition which, when deposited and dried as a layer on an interface of an optical element, will have substantially the same index of refraction as that of the optical element.

Because of the fact that a true solution of dyes in a polymer matrix may be considered to obey Beer's law, the nearly complete attenuation of light, even in a double passage through the layer, would require a layer of very great thickness. Consequently, the use of an overcoat is preferred. The overcoat can be prepared by milling a finely divided carbon black, such as lamp black, into the previously mentioned light-attenuating solution.

However, known lens-edge inks overcoated with lens-edge lacquers gave attenuation factors as high as one part in 300, as compared to an attenuation factor of nearly one part per 100,000 obtained with a dye containing light-attenuating layer overcoated with lamp black.

While the terms "transparent" and "light-transmitting," as used in the present specification and claims, are generally intended to define that characteristic of a substance which permits light to enter thereinto for transmission therethrough, it is to be understood that certain subsances exist which are classed as opaque, but, when matched in refractive index with an optical medium and applied to an interface thereof, will absorb any light incident thereto without perceptible reflection therefrom, and, if the substance were to be applied to the optical medium in a sufficiently thick layer, would expend the light before the light could reach the interface between the substance and air, for example.

The term "dye" as used in the present specification and claims is intended to include any coloring substance having efficient light-attenuating characteristics for the color of the light being used, and in which reflections from the individual particles thereof are negligible, i.e., in which there is no visible "Tyndall effect."

The present invention will be more clearly understood by reference to the ensuing detailed description and drawings wherein.

Figure 1:
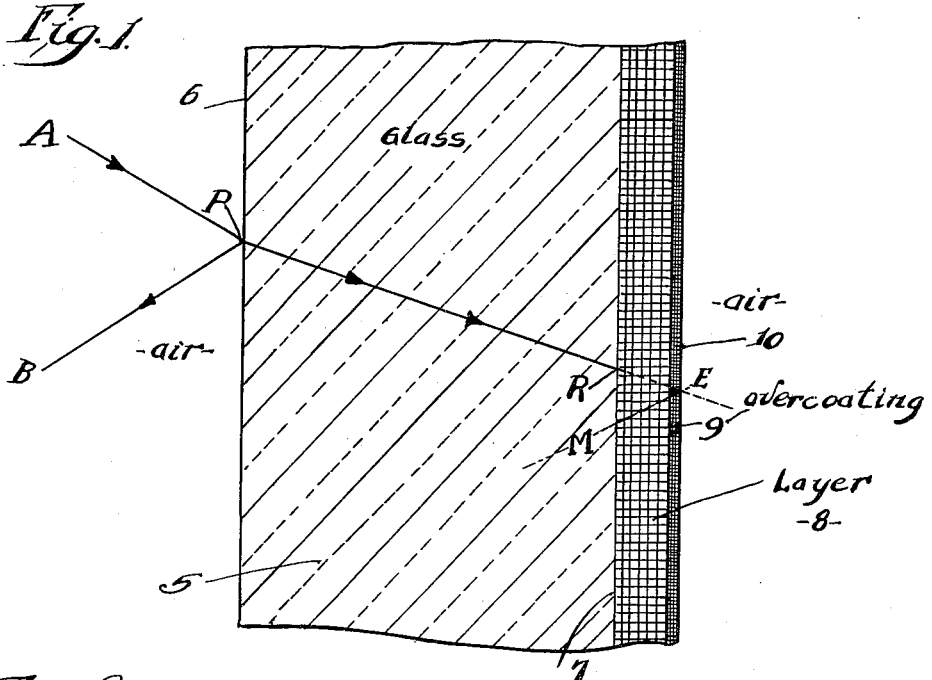
FIGURE 1 is a fragmentary sectional view of an optical element showing one embodiment of the invention.

FIGURE 1 shows a sectionalized portion of an optical element 5 of transparent optical material such as optical glass, for example. The optical element 5 has two parallel opposed faces 6 and 7; the front face 6 being exposed to a ray of light A. For the present example, it is desired that the back face 7 of the element be made as non-reflective as possible to reduce to a negligible value any internal reflections caused by undesirable light rays incident thereto. To accomplish this, the back face 7 is covered, in any manner, with a layer 8 of light-absorbing liquid composition and an overcoat 9, according to the present invention.

The material of optical element 5, for example, is known to have an index of refraction of approximately 1.5. By compounding a solution according to the following formula, a liquid composition is produced which, when spread over the surface 7 of the optical element 5, will dry thereon to form a light-transmitting layer 8, having substantially the same index of refraction as the material of the element 5; e.g., approximately 1.5:

| | Parts |
|---|---|
| Marine spar varnish | 90 |
| Boiled linseed oil | 10 |
| Oil-soluble aniline black dye (Plastene Black) (light-attenuant) | 2 |

In this particular formula, the dye was found to raise the index of refraction of the varnish; the boiled linseed oil was, therefore, used to lower the refractive index to the required value.

If, however, a dye is used which will lower the index of refraction below that which is required, the addition of a suitable amount of a compatible substance having a relatively high refractive index, such as rosin, for example, can be used to raise the index of refraction to the required value.

In the above formula wherein varnish is used for the main vehicle, excellent results have been achieved with white light using an oil-soluble black dye which is available on the market under the trade name of "Plastene Black" dye, which is sold by the Great American Color Company, 2512 West 9th Street, Los Angeles, California, and which is believed to be an aniline black dye. This dye can be purchased in a suitable liquid carrier, such as acetone, or in dry bulk if desired. The color of this dye actually appears, to the eye, to be a dark purple, and its main present commercial use is for coloring transparent plastics.

In addition to the above mentioned Plastene dyes, the following oil-soluble dyes are applicable to formulations of the light-attenuating compositions:

Yellow:
  N,N-dimethyl-p-phenylazoaniline
  1-phenyl azo-naphthylamine
  4-o-tolyl-azo-o-toluidine
  1-o-tolyl-azo-2-naphthylamine
Red:
  1-xylyl-azo-2-naphthol
  1-p-phenyl-azo-phenyl-azo-2-naphthol
  1-xylyl-azo-xylyl-azo-2-naphthol
  1-(o-nitro-p-tolyl-azo)-2-naphthol
Blue:
  Indigotin-2,2'-bisindole-indigo
  3,3'-dichloroindanthrene
  1-4-bis(amylamino)anthroquinone
  5,5''-dibromo-4,4''-dichloro-indigo.

The following additional examples are given to illustrate the preparation of a light-attenuating layer 8 with overcoat 9:

*Example of Solution to Match 1.517 Index Glass*

| | Gm. |
|---|---|
| Chlorinated diphenyl resin (Monsanto Aroclor Resin #5460) | 153.5 |
| Polymethyl methacrylate resin (Du Pont #46 Resin) | 388 |
| Indigotin-2,2'-bisindole-indigo | 12.5 |
| N,N-dimethyl-p-phenylazoaniline | 5 |
| 1-xylyl-azo-2-naphthol | 3 |
| Xylene | 760 |

*Example of a Solution to Match 1.617 Index Glass*

| Chlorinated diphenyl resin (Monsanto Aroclor Resin #5460) | gm | 1250 |
|---|---|---|
| Polymethyl methacrylate resin (Du Pont #46 Resin) | gm | 250 |
| Indigotin-2,2'-bisindole-indigo | gm | 125 |
| N,N-dimethyl-p-phenylazoaniline | gm | 5 |
| 1-xylyl-azo-2-naphthol | gm | 3 |
| Xylene | cc | 750 |

The above solutions were prepared by dissolving the stated amount of dye in the xylene, allowing the solution to stand over-night, and then filtering. The resins were then dissolved in the filtered dye solution.

The resulting mixture of dyes gives a black colored solution. This is the coating solution which on coating and evaporation produces the black dye layer shown in FIGURE 1, as 8.

Another solution as above is made and to this is added 100 grams of lamp black. This was ball-milled at least eight hours. The resultant mixture is the black overcoat solution which on coating over the layer 8 and upon evaporation of the solvent gives the black overcoat 9.

The above light-absorbing compositions, when applied on an optical interface of an optical element as described, have been tested and found to reduce the internal reflections of an image of the sun by a factor of one million ($10^6$), and, furthermore, no appreciable halation from the treated surface was observed. The composition was applied in layer of sufficient thickness to reduce the intensity of the entering ray of light by about one-half.

It is believed that the action of the composition of the present invention is, as follows: a ray of light A–P incident to the front surface 6 of optical element 5 of FIGURE 1, reflects back part of the light in the usual manner as shown by P–B, and enters the optical element 5; being transmitted along path P–R, whereupon the glass layer interface 7 is encountered. Inasmuch as the light absorbing layer 8 has substantially the same index of refraction as the material of optical element 5, no reflection will occur at interface 7 and the light ray will enter the layer 8 and be attenuated therein by the dye.

Presupposing that, even if the light ray R–E is of sufficient intensity to reach the layer-air interface 10, the portion reflected by the latter, shown as broken line E–M, will again be attenuated in the layer 8, and any light re-entering the optical element 5 will be of a negligible value.

While the light-absorbing coating of the present invention has been demonstrated herein using Marine spar varnish as the light-transmitting layer forming vehicle for the light-attenuating coloring substance, it is to be made clear that the light-absorbing composition of the invention is not limited to any particular substance or group of substances, and many other forms of the invention using other materials will come to the minds of skilled artisans. Light-absorbing solutions for application to surfaces of optical elements made of plastic materials such as polymethyl methacrylate, for example, can be composed of the same plastic material in a volatile solvent, and carry a light-attenuating coloring substance in accordance with the present invention. Furthermore, the latter solution can be used on optical elements made of optical glass with equal success; the proper adjustment of the ingredients being made, as taught herein, to obtain the same index of refraction therefor as that of the element to which the solution is to be applied.

Other modifications of the present invention such as light-absorbing compositions of light-absorbing chemical-setting or thermo-setting materials, and carrying a light-attenuating substance can be used, wherein the composition is applied to a surface of an optical element and cured by the use of heat, or catalytically cured at room temperature.

Moreover, other light-absorbing substances naturally containing light-attenuating coloring matter, such as tar (asphalt) for example, and certain naturally occurring dark colored gums (resins), which can be dissolved in a readily evaporating solvent, such as xylene or the like, can be used in conjunction with a mutually soluble layer-forming material; the components being adjusted so that when the composition is applied as a layer on an interface and dried thereon, will have the same optical characteristics as the element to which the composition is to be applied.

No attempt will be made in the present specification to describe exhaustively and illustrate further forms and modifications of the composition of the present invention, inasmuch as it can be seen that the principle of the invention which has been clearly set forth herein will enable those skilled in the art to evolve light-absorbing compositions suitable for other application.

Figure 2:
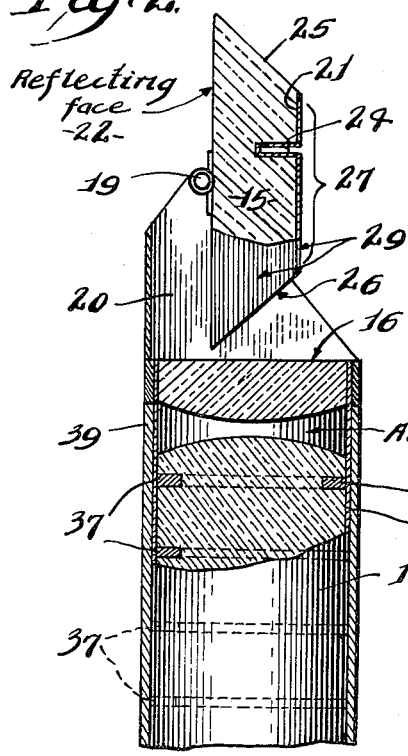
FIGURE 2 is a diagrammatic elevational view of an optical system partly in section to show an application of the present invention.
Figure 3:
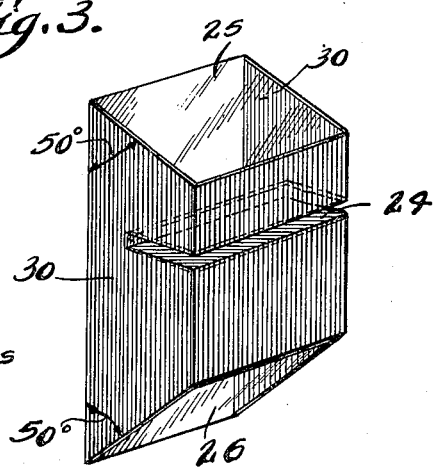
FIGURE 3 is a perspective view of a reflecting prism treated in accordance with the present invention.

The efficiency of structural type glare stops, such as are commonly used in optical systems, can be considerably improved when provided with the light-absorbing composition of the present invention as shown in FIGURES 2 and 3. One example of the combination is shown in FIGURE 2, wherein a reflecting prism 15 of the dove type, for example, is mounted for transmitting light from a radiant source into a telescope. The prism 15 is mounted over the receiving aperture 16 of the vertically positioned telescope transmitting member 17; being movable around the pivot 19 in bracket 20, so that the prism 15 can be relatively moved to follow a moving source of light.

The prism face 21 opposite the reflecting face 22 is provided with a narrow groove 24 between the upper and lower apertures 25 and 26 thereof; the groove 24 extending laterally across the surface at right angles to the optical axis of the prism 15 as best shown in FIGURE 3. In order to obtain the highest possible efficiency in the reduction of internal reflections from the boundary surfaces between the transmitting apertures 25 and 26, the prism is preferably constructed as shown, wherein it has been found that an angle of 50° between the areas of transmission and the base will shunt substantially all of the stray or unwanted light rays which might generate ghost images therein, to the truncated corner 27 of the prism.

The depth of the glare stop groove 24 is, of course, governed by the usual system parameters generally known in the art. A layer 29 of the light-absorbing composition in accordance with the present invention is then applied over the surface of the truncation 27 around the groove 24; all areas of the groove also being covered with the light-absorbing layer, or completely filled therewith. As shown in FIGURE 3, each lateral surface 30 of the prism is also preferably covered with a layer of the light-absorbing composition.

The prism 15, constructed and treated as shown, will efficiently transmit substantially only those light rays desired; the stray and unwanted light rays being blocked by the glare stop 24 and absorbed in the light-absorbing layers 29 of the prism. The prism per se, however, forms no part of the present invention.

Another application of the present invention is depicted in FIGURE 2, being shown in combination with a novel telescope transmitting member 17, for example, which is in the form of a solid cylindrical column of preferably transparent optical material of a known index or refraction, having an air lens 35 defined near the top as shown. The exterior surface of the member 17 is completely covered with a layer 36 of the light-absorbing composition of the present invention. A number of spaced annular glare stop grooves 37 are provided around the circumference of the member 17; all areas of each groove 37 being covered with light-absorbing composition, or completely filled therewith. The entire column 17 can then be supported in an outer sleeve 39 of a resilient material such as metal. In this manner any undesirable light rays incident to the transmitting aperture 16 of the telescope member 17 are effectively blocked by the glare stop grooves 37, and absorbed in the light-absorbing layer 36. Again, the telescope per se forms no part of the present inention.

It has thus been shown that the present invention provides a highly efficient composition for absorbing and attenuating unwanted light when used in conjunction with an interface between two media having different indices of refraction, and has a wide range of forms and embodiments.

From a standpoint of efficiency, simplicity of application and economy, the light-absorbing composition of the present invention in its many forms and modifications is capable of rendering invaluable service in the field of optics.

While in order to comply with the statute, the invention has been described in language more or less specific as to structural features, it is to be understood that the invention is not limited to the specific features shown, but that the composition and process for making the same, as disclosed herein, comprise a preferred form of putting the invention into effect, and the invention is, therefore, claimed in any of its forms or modifications within the legitimate and valid scope of the appended claims.

I claim:

1. An optical element having minimum multiple internal light reflections from a face thereof; comprising in combination a transparent optical member made of a material having a known uniform index of refraction, said face tending to internally reflect light entering said element, a light attenuating dye-containing layer of material having the same uniform index of refraction as that of said member, said light attenuating layer having a light-attenuating thickness ratio sufficient to prevent significant return of light entering said layer at said member-layer interface into said member by reflection from said external face of said layer, and an overcoat layer consisting essentially of carbon black and the dye conposition of said underlayer.

2. An optical element having minimum multiple internal light reflections from a face thereof; comprising in combination a transparent optical member made of a material having a known uniform index of refraction and having a face tending to internally reflect light entering said element, a light attenuating dark oil soluble dye containing layer of material having the same uniform index of refraction as that of said optical member and externally bonded to said face, said light attenuating layer having a light attenuating thickness ratio sufficient to absorb about one-half of the light entering said layer before the exterior surface of said layer is reached by said light and an overcoat layer consisting essentially of lamp-black uniformly distributed in the same dye composition as the underlying layer.

3. An optical element having minimum multiple internal reflections from a face thereof; comprising in combination a transparent optical member made of a material having a known uniform index of refraction and having a face thereof tending to internally reflect light entering said element, an adherent layer of a mixture of colored dyes mixed to give a substantially black appearance, externally applied to said face, said layer having the same uniform index of refraction as that of said member, and an overcoat layer consisting essentially of finely divided carbon black dispersed in a composition containing the same dyes and in the same proportions as in said underlying composition.

4. An optical element having minimum multiple internal reflections from a face thereof; comprising in combination a transparent optical member made of a material having a known uniform index of refraction and having a face thereof tending to internally reflect light entering said element, a layer of adherent material externally applied to said face and a quantity of oil soluble dark colored dye dissolved in said layer of adherent material, said adherent dyed material having the same uniform index of refraction as that of said optical element, and an overcoat consisting of a film forming material having carbon black and an oil soluble dye of dark coloration dispersed therein, said dye being the same dye as in the adherent layer applied to the face.

5. An optical element having minimum multiple internal reflections from a face thereof; comprising in combination a transparent optical member made of a material having a known uniform index of refraction and having a face tending to internally reflect light entering said member, a layer of varnish, a quantity of oil soluble dye dissolved in said varnish, said dyed varnish having the same uniform index of refraction as said member, and an overcoat layer consisting of the same composition as said dyed varnish with the addition of carbon black.

6. An optical element according to claim 5 wherein said oil soluble dye is dark purple in color.

References Cited in the file of this patent

UNITED STATES PATENTS

| | | |
|---|---|---|
| 942,589 | Salsbury | Dec. 7, 1909 |
| 1,525,657 | Roach | Feb. 10, 1925 |
| 1,647,435 | Clewell | Nov. 1, 1927 |
| 1,687,119 | Benson et al. | Oct. 9, 1928 |
| 2,447,828 | West | Aug. 24, 1948 |
| 2,450,746 | Bliss | Oct. 5, 1948 |
| 2,579,543 | Brode et al. | Dec. 25, 1951 |
| 2,611,294 | Luboshez | Sept. 23, 1952 |